United States Patent
Hong

(10) Patent No.: US 11,467,745 B2
(45) Date of Patent: Oct. 11, 2022

(54) STORAGE DEVICE AND METHOD OF OPERATING THE SAME

(71) Applicant: SK hynix Inc., Icheon-si Gyeonggi-do (KR)

(72) Inventor: Jiman Hong, Icheon-si Gyeonggi-do (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 17 days.

(21) Appl. No.: 16/917,739

(22) Filed: Jun. 30, 2020

(65) Prior Publication Data

US 2021/0132803 A1    May 6, 2021

(30) Foreign Application Priority Data

Nov. 5, 2019 (KR) .................. 10-2019-0140519

(51) Int. Cl.
*G06F 12/02* (2006.01)
*G06F 3/06* (2006.01)

(52) U.S. Cl.
CPC ............ *G06F 3/064* (2013.01); *G06F 3/0608* (2013.01); *G06F 3/0679* (2013.01); *G06F 12/0253* (2013.01); *G06F 2212/1041* (2013.01)

(58) Field of Classification Search
CPC .......... G06F 2212/7205; G06F 3/0679; G06F 3/064; G06F 12/0253; G06F 3/0608; G06F 2212/7208; G06F 12/0238; G06F 2212/7203; G06F 2212/7209; G06F 2212/1041

USPC ........................................................ 711/103
See application file for complete search history.

(56) References Cited

U.S. PATENT DOCUMENTS

| | | | |
|---|---|---|---|
| 7,057,937 B1* | 6/2006 | Matsubara | G11C 16/16 365/185.24 |
| 2013/0151759 A1* | 6/2013 | Shim | G06F 3/0608 711/103 |
| 2016/0321172 A1* | 11/2016 | Jinzenji | G06F 12/0246 |
| 2017/0109085 A1* | 4/2017 | Jinzenji | G06F 3/064 |
| 2017/0168951 A1* | 6/2017 | Kanno | G06F 3/0679 |
| 2018/0067863 A1* | 3/2018 | Ki | G06F 12/0866 |
| 2018/0276118 A1* | 9/2018 | Yanagida | G06F 3/0688 |
| 2019/0121728 A1* | 4/2019 | Jung | G06F 12/0261 |

FOREIGN PATENT DOCUMENTS

KR    1020150103932 A    9/2015
KR    1020190056211 A    5/2019

* cited by examiner

*Primary Examiner* — Hashem Farrokh
(74) *Attorney, Agent, or Firm* — William Park & Associates Ltd.

(57) ABSTRACT

A memory controller, for controlling a memory device including a plurality of memory blocks, includes a garbage collection controller configured to determine candidate blocks in which valid data is equal to or less than a predetermined ratio among the plurality of memory blocks, and configured to determine at least two or more memory blocks as victim blocks among the candidate blocks based on information on blocks that may be simultaneously erased among the plurality of memory blocks. The memory controller also includes an operation controller configured to control the memory device to copy valid data stored in the victim blocks to a different memory block.

20 Claims, 13 Drawing Sheets

| | Simultaneously Erasable BLK in BLK_GR1 | Erasable BLK # |
|---|---|---|
| Case1 | BLK1, BLK2, BLK3, BLK4 | 1 |
| Case2 | (BLK1, BLK3), (BLK2, BLK4), (BLK1, BLK2), (BLK3, BLK4) | 2 |
| Case3 | (BLK1, BLK2, BLK3, BLK4) | 3 |

STORAGE DEVICE AND METHOD OF OPERATING THE SAME

CROSS-REFERENCE TO RELATED APPLICATION

The present application claims priority under 35 U.S.C. § 119(a) to Korean patent application number 10-2019-0140519, filed on Nov. 5, 2019, in the Korean Intellectual Property Office, the entire disclosure of which is incorporated herein by reference.

BACKGROUND

1. Technical Field

The present disclosure relates to an electronic device, and more particularly, to a storage device and a method of operating the storage device.

2. Related Art

A storage device is a device that stores data under the control of a host device, such as a computer or a smartphone. A storage device may include a memory device in which data is stored and a memory controller for controlling the memory device. The memory device may be a volatile memory device or a non-volatile memory device.

A volatile memory device is a device that stores data only when power is supplied and loses the stored data when the power supply is cut off. Volatile memory devices include static random access memory (SRAM), dynamic random access memory (DRAM), and the like.

A non-volatile memory device is a device that does not lose data even when power is cut off. Non-volatile memory devices include read only memory (ROM), programmable ROM (PROM), electrically programmable ROM (EPROM), electrically erasable and programmable ROM (EEPROM), flash memory, and the like.

SUMMARY

According to an embodiment of the present disclosure, a memory controller, for controlling a memory device including a plurality of memory blocks, includes a garbage collection controller configured to determine candidate blocks in which valid data is equal to or less than a predetermined ratio among the plurality of memory blocks, and configured to determine at least two memory blocks as victim blocks among the candidate blocks based on information on blocks that may be simultaneously erased among the plurality of memory blocks. The memory controller also includes an operation controller configured to control the memory device to copy valid data stored in the victim blocks to a different memory block.

According to an embodiment of the present disclosure, a memory controller, for controlling a memory device including a plurality of memory blocks, includes a garbage collection controller and an operation controller. The garbage collection controller is configured to determine the reference number of victim blocks based on a number of free blocks among the plurality of memory blocks, and configured to determine candidate blocks as the victim blocks based on a comparison result of the number of the candidate blocks that may be simultaneously erased among the plurality of memory blocks and the reference number of victim blocks. The operation controller is configured to control the memory device to copy valid data stored in the victim blocks to a different memory block.

According to an embodiment of the present disclosure, a method of operating a storage device including a plurality of memory blocks includes determining candidate blocks in which valid data is equal to or less than a predetermined ratio among the plurality of memory blocks. The method also includes determining at least two memory blocks that may be simultaneously erased as victim blocks among the candidate blocks and copying valid data stored in the victim blocks to a different memory block.

DETAILED DESCRIPTION

Embodiments according to the concept of the present disclosure may be carried out in various forms and are not limited to the embodiments described in the present specification or application.

Hereinafter, embodiments of the present disclosure will be described in detail with reference to the accompanying drawings. Some embodiments of the present disclosure are directed to a storage device having improved garbage collection performance. Other embodiments are directed to operating such a storage device.

Figure 1:
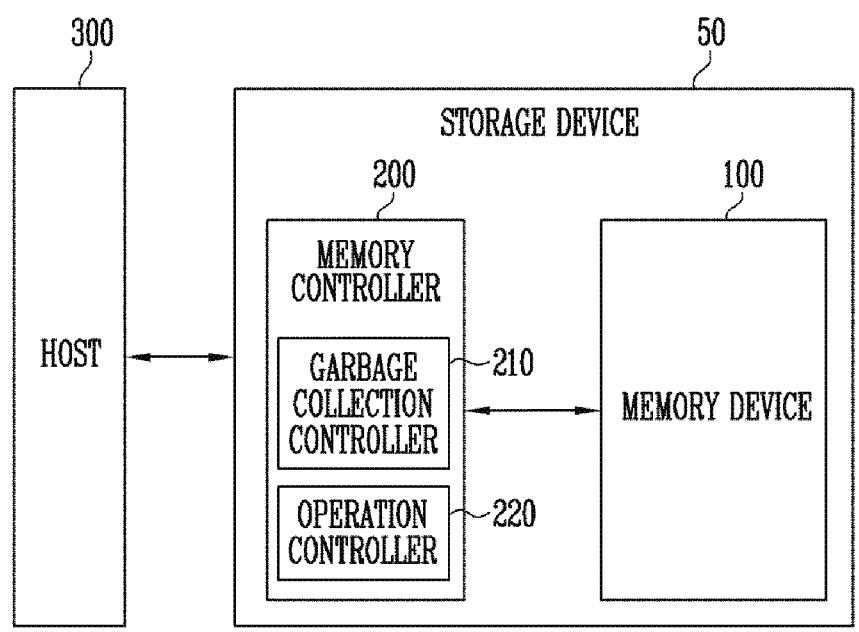
FIG. 1 is a diagram for describing a storage device according to an embodiment of the present disclosure.

FIG. 1 is a diagram for describing a storage device according to an embodiment of the present disclosure.

Referring to FIG. 1, the storage device 50 may include a memory device 100 and a memory controller 200 controlling an operation of the memory device 100. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to an interface of a host 300 which is a communication method with the host 300. For example, the storage device 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates in response to control of the memory controller 200. The memory device 100 may include a memory cell array including a plurality of memory cells storing the data.

Each of the memory cells may be configured as a single-level cell (SLC) that stores one data bit, a multi-level cell (MLC) that stores two data bits, a triple-level cell (TLC) that stores three data bits, or a quad-level cell (QLC) that stores four data bits.

The memory cell array may include a plurality of memory blocks. Each of the memory blocks may include a plurality of memory cells. One memory block may include a plurality of pages. In an embodiment, a page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command and an address from the memory controller 200 and access an area selected by the address in the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls overall operations of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the logical block address (LBA) into a physical block address (PBA) indicating an address of memory cells in which data included in the memory device 100 is to be stored.

The memory controller 200 may control the memory device 100 to perform the program operation, the read operation, or the erase operation in response to a request from the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide a command, an address, and data to the memory device 100 so as to perform background operations such as a program operation for wear leveling and a program operation for garbage collection.

In an embodiment, the memory controller 200 may control at least two memory devices 100. In this case, the memory controller 200 may control the memory devices 100 according to an interleaving method so as to improve operation performance. The interleaving method may be an operation method for overlapping operation periods of at least two memory devices 100.

In an embodiment, the memory controller 200 may control the memory device 100 to perform a garbage collection operation of copying valid data stored in a victim block to another memory block and securing a free block. The free block may be a memory block that does not store the valid data. The free block may store new data after being erased.

In an embodiment, the memory controller 200 may include a garbage collection controller 210 and an operation controller 220.

In an embodiment, the garbage collection controller 210 may determine candidate blocks in which valid data is equal to or less than a predetermined ratio among the memory blocks of the memory device 100. For example, whether the valid data is equal to or less than the predetermined ratio is determined based on a comparison between a total amount of data a memory block can store and an amount of valid data stored in the memory block. The candidate blocks may be memory blocks in which the number of pages storing the valid data is equal to or less than a predetermined number. The word "predetermined" as used herein with respect to a parameter, such as a predetermined ratio among memory blocks, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm. The garbage collection controller 210 may determine two or more memory blocks that may be simultaneously erased as the victim blocks among the candidate blocks.

Specifically, the garbage collection controller 210 may determine two or more memory blocks as the victim blocks among the candidate blocks based on information on blocks that may be simultaneously erased among the plurality of memory blocks.

In an embodiment, the fact that selected memory blocks may be simultaneously erased among the plurality of memory blocks means that only data of the selected memory blocks is erased by one erase operation and data of the remaining memory blocks is not erased and is maintained.

The garbage collection controller 210 may determine the victim blocks so that the memory blocks to be simultaneously erased in a garbage collection operation becomes maximum. As the number of memory blocks to be simultaneously erased in one erase operation increases, a total erase time required to secure the same number of free blocks may be shortened.

The garbage collection controller 210 may determine the victim blocks so that an amount of the valid data stored in the memory blocks to be simultaneously erased in the garbage collection operation becomes minimum. As the amount of the valid data stored in the victim block decreases, efficiency of the garbage collection operation may increase.

The garbage collection controller 210 may determine the number of victim blocks according to a supply amount of the free block determined based on the number of free blocks among the memory blocks of the memory device 100. For example, it is assumed that n (n is a natural number of equal to or greater than 1) memory blocks or m (m is a natural number greater than n) memory blocks among the candidate blocks may be simultaneously erased.

When the supply amount of the free block is insufficient, the garbage collection controller 210 may determine the number of victim blocks as n. This is because when the number of victim blocks is n, the garbage collection operation takes less time and the free blocks may be secured faster than a case where the number of victim blocks is m. In contrast, when the supply amount of the free block is sufficient, the garbage collection controller 210 may determine the number of victim blocks as m. This is because when the number of victim blocks is m, the garbage collection operation takes longer time, but a larger number of free blocks may be secured, than a case where the number of victim blocks is n.

In another embodiment, the garbage collection controller 210 may determine the reference number of victim blocks based on the number of free blocks among the memory blocks of the memory device 100. The garbage collection controller 210 may determine the victim blocks based on information on the candidate blocks among the plurality of memory blocks, information on the blocks that may be simultaneously erased among the plurality of memory blocks, and the reference number.

Specifically, the garbage collection controller 210 may determine the candidate blocks that may be simultaneously erased from among the plurality of memory blocks based on the information on the candidate blocks and the information on the blocks that may be simultaneously erased. The garbage collection controller 210 may determine the candidate blocks that may be simultaneously erased as the victim blocks based on a comparison result of the number of candidate blocks that may be simultaneously erased and the reference number. For example, when the number of candidate blocks that may be simultaneously erased is equal to greater than the reference number, the garbage collection controller 210 may determine corresponding candidate blocks among all candidate blocks as the victim blocks.

In an embodiment, the garbage collection controller 210 may monitor the number of candidate blocks among the plurality of memory blocks. The candidate blocks may be memory blocks in which the valid data is equal to or less than a predetermined ratio.

The operation controller 220 may control the memory device 100 to copy the valid data stored in the victim blocks to a different memory block. When the valid data stored in the victim blocks is copied to the other memory block, the operation controller 220 may control the memory device 100 to simultaneously erase the victim blocks.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
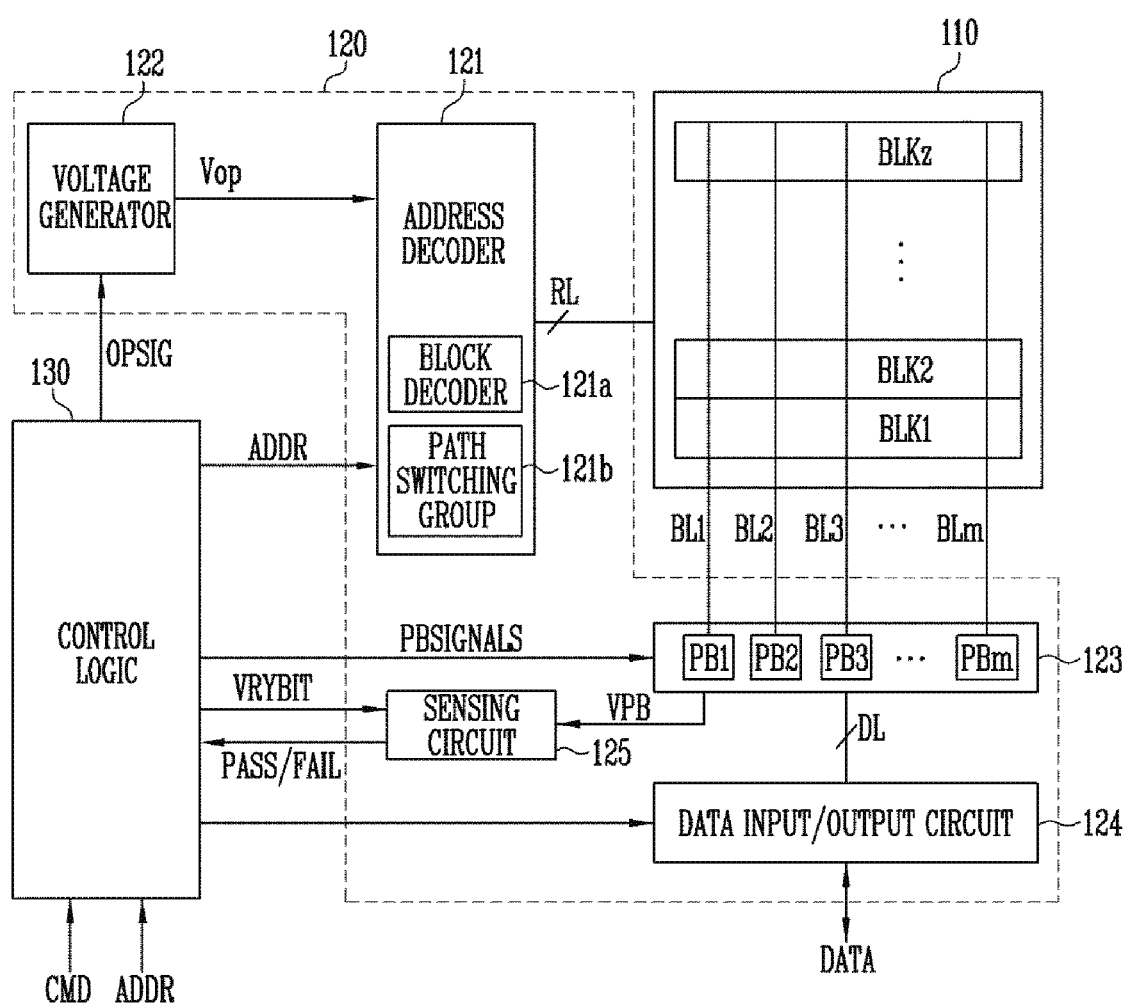
FIG. 2 is diagram for describing a structure of a memory device of FIG. 1.

FIG. 2 is diagram for describing a structure of the memory device of FIG. 1.

Referring to FIG. 2, a memory device 100 may include a memory cell array 110, a peripheral circuit 120, and control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. As an embodiment, the plurality of memory cells are non-volatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as a single-level cell (SLC) that stores one data bit, a multi-level cell (MLC) that stores two data bits, a triple-level cell (TLC) that stores three data bits, or a quad-level cell (QLC) that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of the selected memory block according to the decoded row address. The address decoder 121 may apply an operation voltage Vop, which is received from the voltage generator 122, to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in memory block units. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

In an embodiment, the address decoder 121 may include a block decoder 121a and a path switching group 121b. The block decoder 121a may decode a block address and select a memory block based on the decoded block address. The path switching group 121b may transfer the operation voltage Vop generated by the voltage generator 122 to row lines RL connected to the selected memory block under control of the block decoder 121a.

The voltage generator 122 is configured to generate a plurality of operation voltages Vop by using an external power voltage supplied to the memory device 100. The voltage generator 122 operates in response to the control of the control logic 130.

As an example, the voltage generator 122 may generate an internal power voltage by regulating the external power voltage. The internal power voltage generated by the voltage generator 122 is used as an operation voltage of the memory device 100.

As an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors to generate the plurality of operation voltages Vop.

The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. As an embodiment, the read and write circuit 123 may include a column selection circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of a permission bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device. The control logic 130 may be implemented as hardware, software, or a combination of hardware and software. For example, the control logic 130 may be a control logic circuit operating in accordance with an algorithm and/or a processor executing control logic code.

The control logic 130 may generate various signals in response to the command CMD and the address ADDR to control the peripheral circuit 120. For example, the control logic 130 may generate an operation signal OPSIG, an address ADDR, a read and write circuit control signal PBSIGNALS, and the permission bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the permission bit VRYBIT to the sensing circuit 125. In addition, the control logic 130 may determine whether the verify operation is passed or failed in response to the pass or fail signal PASS/FAIL output by the sensing circuit 125.

Figure 3:
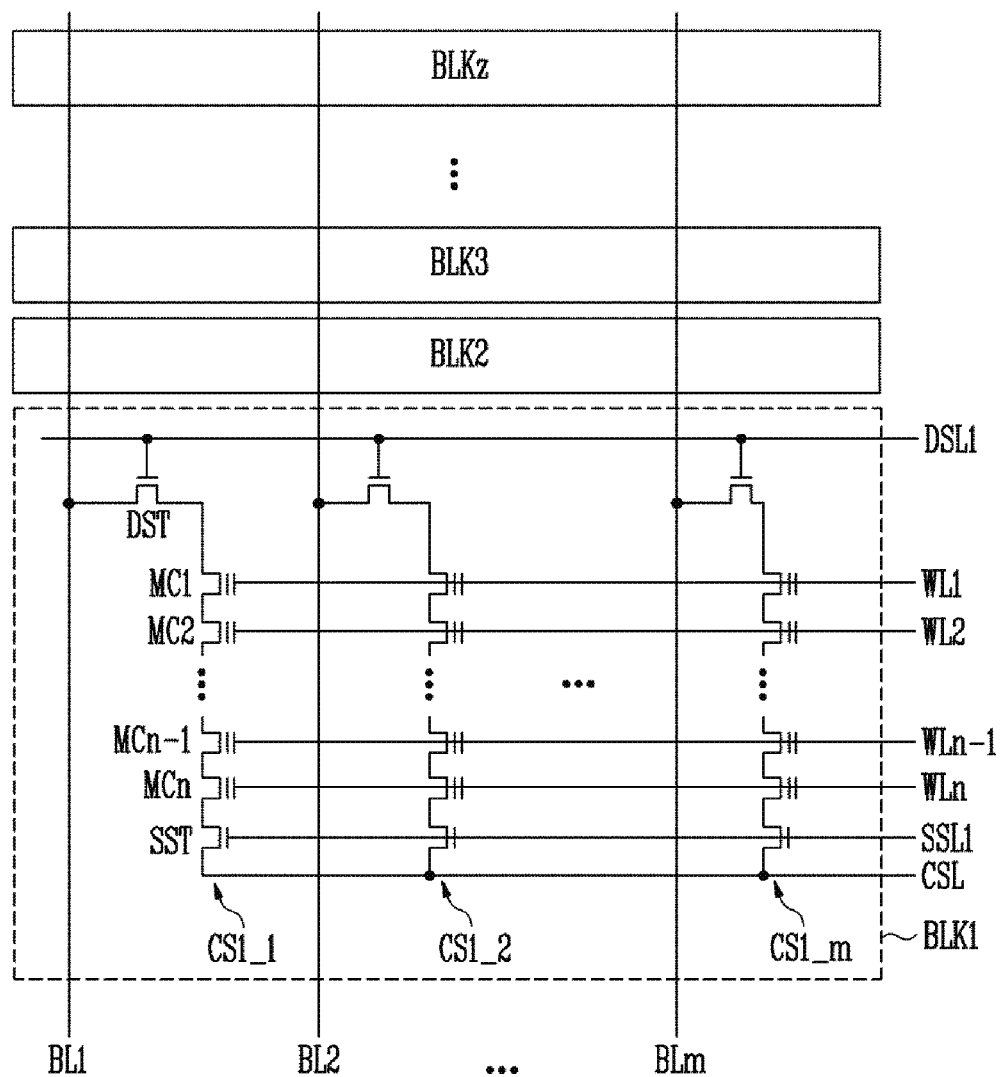
FIG. 3 is a diagram for describing the memory cell array of FIG. 2.

FIG. 3 is a diagram for describing the memory cell array of FIG. 2.

Referring to FIG. 3, the first to z-th memory blocks BLK1 to BLKz of the memory cell array 110 are commonly connected to the first to m-th bit lines BL1 to BLm. In FIG. 3, for convenience of description, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz is configured similarly to the first memory block BLK1.

The first memory block BLK1 may include a plurality of cell strings CS1_1 to CS1_m (m is a positive integer). The first to m-th cell strings CS1_1 to CS1_m are connected to the first to m-th bit lines BL1 to BLm, respectively. Each of the first to m-th cell strings CS1_1 to CS1_m includes a drain select transistor DST, a plurality of memory cells MC1 to MCn connected in series (n is a positive integer), and a source select transistor SST.

Gate terminals of the drain select transistors DST included in each of the first to m-th cell strings CS1_1 to CS1_m are connected to a drain select line DSL1. Gate terminals of the first to n-th memory cells MC1 to MCn included in each of the first to m-th cell strings CS1_1 to CS1_m are connected to the first to n-th word lines WL1 to WLn, respectively. Gate terminals of the source select transistors SST included in each of the first to m-th cell strings CS1_1 to CS1_m are connected to a source select line SSL1.

For convenience of description, a structure of the cell string will be described with reference to the first cell string CS1_1 of the plurality of cell strings CS1_1 to CS1_m. However, it will be understood that each of the remaining cell strings CS1_2 to CS1_m is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. As an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
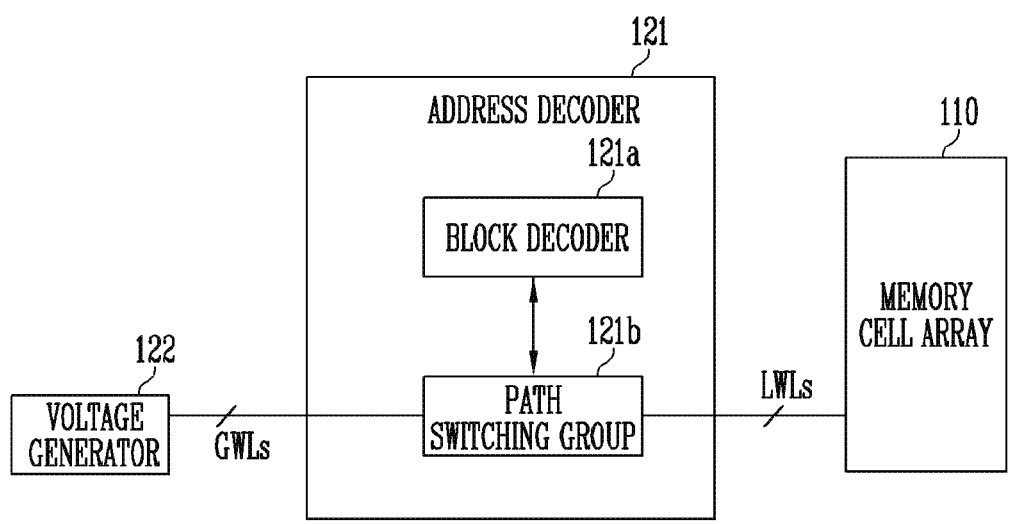
FIG. 4 is a diagram for describing a configuration and an operation of the memory device of FIG. 2.

FIG. 4 is a diagram for describing a configuration and an operation of the memory device of FIG. 2.

Referring to FIGS. 2 and 4, the voltage generator 122 may be connected to the path switching group 121b through a global word line GWL. The voltage generator 122 may generate an operation voltage to be applied to the global word line GWL in response to the operation control signal OPSIG. The operation voltage applied to the global word line GWL may be transferred to a local word line LWL connected to the memory block of the memory cell array 110 through the path switching group 121b.

The address decoder 121 may include the block decoder 121a and the path switching group 121b.

The block decoder 121a may decode the block address among the received addresses ADDR. The block decoder 121a selects at least one memory block among the plurality of memory blocks according to the decoded block address. The block decoder 121a may generate a block word line control signal for selecting at least one memory block. The block decoder 121a may control the path switching group 121b through the block word line control signal.

The path switching group 121b may include a plurality of path switching circuits. Each of the path switching circuits may connect the global word line GWL and the local word line LWL to each other. Each of the path switching circuits may electrically connect or disconnect between the global word line GWL and the local word line LWL according to the block word line control signal.

In an embodiment, one global word line GWL may be connected to two or more local word lines LWL through the path switching circuits included in the path switching group 121b. A more detailed structure will be described later with reference to FIG. 5.

Figure 5:
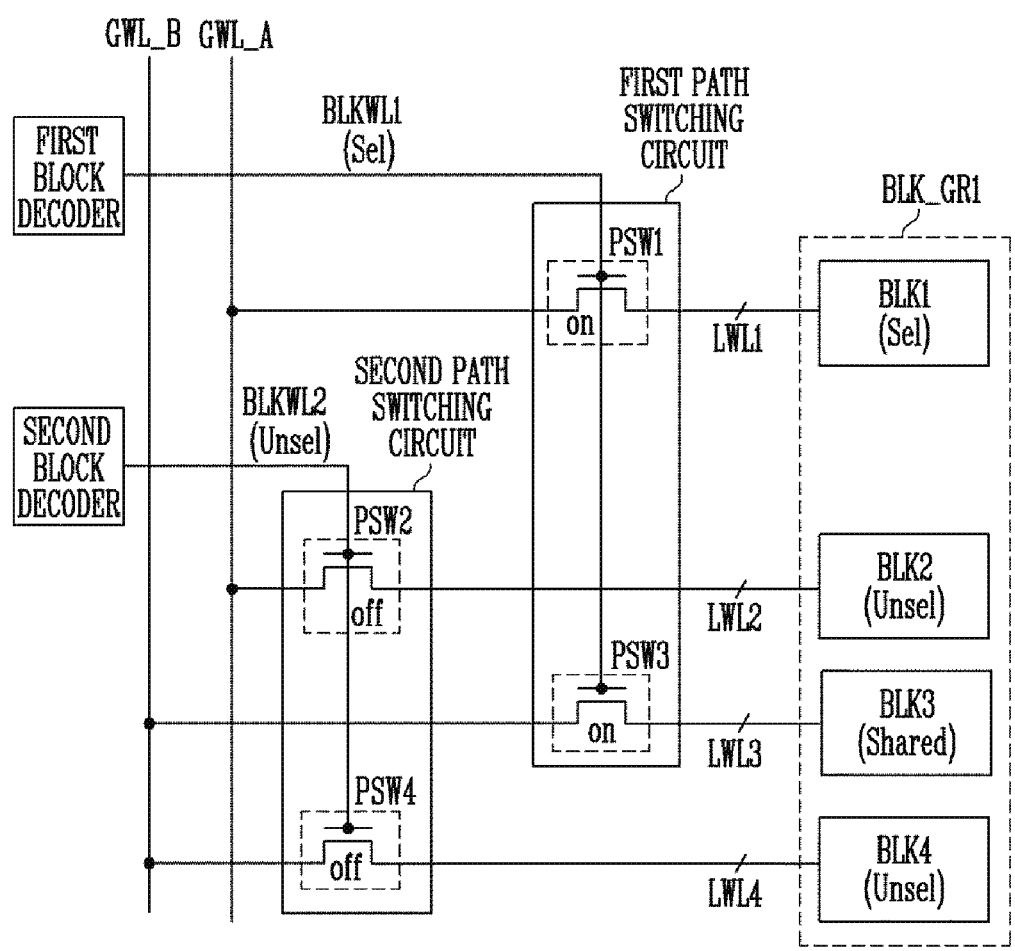
FIG. 5 is a diagram for describing a connection structure of memory blocks according to an embodiment.

FIG. 5 is a diagram for describing a connection structure of the memory blocks according to an embodiment.

Referring to FIG. 5, the memory cell array described with reference to FIG. 4 may include a first memory block group BLK_GR1. The first memory block group BLK_GR1 may include first to fourth memory blocks BLK4. The number of memory block groups included in the memory cell array and the number of memory blocks included in each memory block group are not limited to the present embodiment.

First and second path switching circuits may correspond to the first memory block group BLK_GR1.

The first path switching circuit may include a first path switch PSW1 and a third path switch PSW3. The second path switching circuit may include a second path switch PSW2 and a fourth path switch PSW4. The number of path switching circuits corresponding to the memory block group and the number of path switches included in each path switching circuit are not limited to the present embodiment.

The first memory block BLK1 may be connected to a first global word line GWL_A through the first path switch PSW1. The second memory block BLK2 may be connected to the first global word line GWL_A through the second path switch PSW2. The third memory block BLK3 may be connected to a second global word line GWL_B through the third path switch PSW3. The fourth memory block BLK4 may be connected to the second global word line GWL_B through the fourth path switch PSW4.

The first path switching circuit may be connected to a first block decoder through a first block word line BLKWL1. The first and third path switches PSW1 and PSW3 included in the first path switching circuit may be controlled according to a first block word line control signal generated by the first block decoder.

Specifically, the first path switch PSW1 may electrically connect or disconnect between a local word line LWL1 and the first global word line GWL_A of the first memory block BLK1 according to the first block word line control signal. The third path switch PSW3 may electrically connect or disconnect between a local word line LWL3 and the second global word line GWL_B of the third memory block BLK3 according to the first block word line control signal.

The second path switching circuit may be connected to a second block decoder through a second block word line BLKWL2. The second and fourth path switches PSW2 and PSW4 included in the second path switching circuit may be controlled according to a second block word line control signal generated by the second block decoder.

Specifically, the second path switch PSW2 may electrically connect or disconnect between a local word line LWL2 and the first global word line GWL_A of the second memory block BLK2 according to the second block word line control signal. The fourth path switch PSW4 may electrically connect or disconnect between a local word line LWL4 and the second global word line GWL_B of the fourth memory block BLK4 according to the second block word line control signal.

In FIG. 5, at least one memory block may be selected among the memory blocks of the first memory block group BLK_GR1 according to the operation voltages applied to the first and second global word lines GWL_A and GWL_B and the first and second block word line control signals.

For example, the first block word line control signal may be activated and the second block word line control signal may be deactivated. The operation voltage may be applied to the first global word line GWL_A and the operation voltage might not be applied to the second global word line GWL_B.

In this case, the first memory block BLK1 electrically connected to the first global word line GWL_A, to which the operation voltage is applied, through the first path switch PSW1 may be the selected memory block. The third memory block BLK3 electrically connected to the second global word line GWL_B, to which the operation voltage is not applied, through the third path switch PSW3 may be a shared memory block. The second and fourth memory blocks BLK2 and BLK4 electrically disconnected from the first and second global word lines GWL_A and GWL_B may be unselected memory blocks. The operation voltage applied to the first global word line GWL_A may be transferred to the local word line LWL of the first memory block BLK1, and a memory operation on the first memory block BLK1 may be performed. The memory operation may include a read operation, an erase operation, and a program operation.

In various embodiments, the memory operation may be simultaneously performed on at least one or more memory blocks among the memory blocks of the first memory block group BLK_GR1 according to the operation voltages applied to the first and second global word lines GWL_A and GWL_B and the first and second block word line control signals. This will be described in more detail with reference to FIG. 6.

Figures 6, 7:
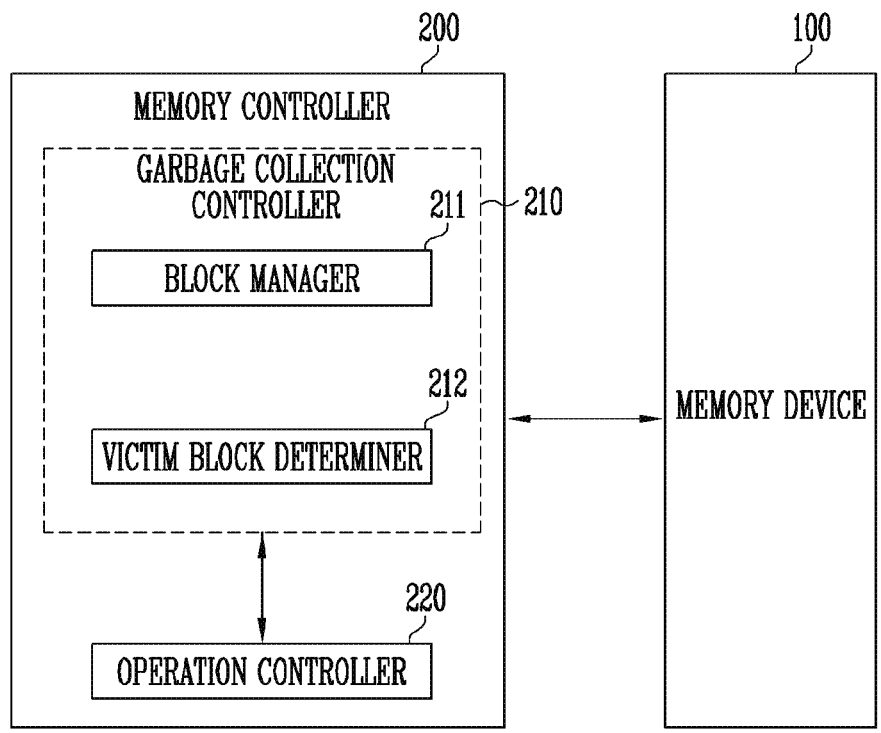
FIG. 6 is a diagram for describing a memory block that may be simultaneously erased according to an embodiment.
FIG. 7 is a diagram for describing a configuration and an operation of a memory controller of FIG. 1.

FIG. 6 is a diagram for describing the memory block that may be simultaneously erased according to an embodiment.

Referring to FIGS. 5 and 6, memory blocks that may be simultaneously erased among the first to fourth memory blocks BLK1 to BLK4 of the first memory block group BLK_GR1 may be classified into three cases.

The fact that the selected memory blocks may be simultaneously erased among the plurality of memory blocks means that only data of the selected memory blocks is erased by one erase operation and data of the remaining memory blocks is not erased and is maintained.

First, one memory block among the first to fourth memory blocks may be erased.

For example, the first block word line control signal may be activated and the second block word line control signal may be deactivated. The operation voltage may be applied to the first global word line GWL_A and the operation voltage might not be applied to the second global word line GWL_B. In this case, only the first memory block BLK1 may be selected and only the first memory block BLK1 may be erased.

The first block word line control signal may be activated and the second block word line control signal may be deactivated. The operation voltage might not be applied to the first global word line GWL_A and the operation voltage may be applied to the second global word line GWL_B. In this case, only the third memory block BLK3 may be selected and only the third memory block BLK3 may be erased.

The first block word line control signal may be deactivated and the second block word line control signal may be activated. The operation voltage may be applied to the first global word line GWL_A and the operation voltage might not be applied to the second global word line GWL_B. In this case, only the second memory block BLK2 may be selected and only the second memory block BLK2 may be erased.

The first block word line control signal may be deactivated and the second block word line control signal may be activated. The operation voltage might not be applied to the first global word line GWL_A and the operation voltage may be applied to the second global word line GWL_B. In this case, only the fourth memory block BLK4 may be selected and only the fourth memory block BLK4 may be erased.

Secondly, two memory blocks among the first to fourth memory blocks may be simultaneously erased.

For example, the first block word line control signal may be activated and the second block word line control signal may be deactivated. The operation voltage may be applied to the first and second global word lines GWL_A and GWL_B. In this case, the first and third memory blocks BLK1 and BLK3 may be selected and the first and third memory blocks BLK1 and BLK3 may be simultaneously erased.

The first block word line control signal may be deactivated and the second block word line control signal may be activated. The operation voltage may be applied to the first and second global word lines GWL_A and GWL_B. In this case, the second and fourth memory blocks BLK2 and BLK4 may be selected and the second and fourth memory blocks BLK2 and BLK4 may be simultaneously erased.

The first and second block word line control signals may be activated. The operation voltage may be applied to the first global word line GWL_A and the operation voltage might not be applied to the second global word line GWL_B. In this case, the first and second memory blocks BLK1 and BLK2 may be selected and the first and second memory blocks BLK1 and BLK2 may be simultaneously erased.

The first and second block word line control signals may be activated. The operation voltage might not be applied to the first global word line GWL_A and the operation voltage may be applied to the second global word line GWL_B. In this case, the third and fourth memory blocks BLK3 and BLK4 may be selected and the third and fourth memory blocks BLK3 and BLK4 may be simultaneously erased.

Third, four memory blocks among the first to fourth memory blocks may be simultaneously erased.

For example, the first and second block word line control signals may be activated. The operation voltage may be applied to the first and second global word lines GWL_A and GWL_B. In this case, the first to fourth memory blocks BLK1 to BLK4 may be selected and the first to fourth memory blocks BLK1 to BLK4 may be simultaneously erased.

According to an embodiment of the present disclosure, as the number of memory blocks that are simultaneously erased increases, the total erase time of the memory blocks in the garbage collection operation may be shortened. For example, when it is assumed that one erase operation takes tER, 4tER may take when the first to fourth memory blocks are individually erased one by one. 2tER may take when the first to fourth memory blocks are simultaneously erased two by two. tER may take when the first to fourth memory blocks are simultaneously erased four by four.

Therefore, when the first to fourth memory blocks are erased two by two, the total erase time of the memory blocks may be shortened by 2tER−tER=tER in comparison with a case where the first to fourth memory blocks are erased one by one. When the first to fourth memory blocks are erased four by four, the total erase time of the memory blocks may be shortened by 4tER−tER=3tER in comparison with the case where the first to fourth memory blocks are erased one by one.

In various embodiments, the number of victim blocks simultaneously erased may be determined according to the supply amount of the free block determined based on the number of free blocks of the memory device.

For example, when the number of free blocks of the memory device is equal to or less than a first reference value, the supply amount of the free block may be insufficient and a fast free block securement may be required. When the number of free blocks is equal to or greater than the first reference value and is equal to or less than a second reference value, the supply amount of the free block may be normal and a general free block securement may be required. When the number of free blocks is equal to or greater than the second reference value and is equal to or less than a third reference value, the supply amount of the free block may be sufficient and the fast free block securement might not be required. As described above, it may be determined whether the supply amount of the free block is sufficient according to the number of free blocks.

In FIG. 6, when the supply amount of the free block is insufficient, the number of victim blocks may be determined as one as in the first case. This is because the fast free block securement is possible because only valid data stored in one victim block is required to be copied to the other memory block.

When the supply amount of free blocks is normal, the number of victim blocks may be determined as two as in the second case. This is because larger number of free block may be secured as two although the garbage collection operation takes longer time than a case where the number of victim blocks is one, because only valid data stored in two victim blocks is required to be copied to the other memory block.

When the supply amount of free blocks is sufficient, the number of victim blocks may be determined as four as in the third case. This is because larger number of free block may be secured as four although the garbage collection operation takes longer time than a case where the number of victim blocks is two, because only valid data stored in four victim blocks is required to be copied to the other memory block.

FIG. 7 is a diagram for describing a configuration and an operation of the memory controller of FIG. 1.

Referring to FIG. 7, the memory controller 200 may include the garbage collection controller 210 and the operation controller 220.

The garbage collection controller 210 may include a block manager 211 and a victim block determiner 212.

The block manager 211 may store block management information on the plurality of memory blocks of the memory device 100. The block management information may include candidate block information indicating the candidate blocks in which the valid data is equal to or less than a predetermined ratio among the plurality of memory blocks. The block management information may include free block information indicating the free block among the plurality of memory blocks. The block management information may include simultaneously erasable block information indicating the memory blocks that may be simultaneously erased among the plurality of memory blocks described with reference to FIG. 6. The block management information may include simultaneously erasable block information corresponding to each memory block group included in the memory device 100.

The victim block determiner 212 may determine the victim block based on the block management information.

In an embodiment, the victim block determiner 212 may monitor the candidate blocks in which the valid data is equal to or less than the predetermined ratio among memory blocks of the memory device 100, based on the candidate block information. The candidate blocks may be memory blocks in which the number of pages storing the valid data is equal to or less than a predetermined number.

The victim block determiner 212 may determine two or more memory blocks that may be simultaneously erased among the candidate blocks as victim blocks based on the candidate block information and the simultaneously erasable block information.

The victim block determiner 212 may determine the victim blocks so that the memory blocks to be simultaneously erased in the garbage collection operation becomes the maximum. As the number of memory blocks to be simultaneously erased by one erase operation increases, the total erase time required to secure the same number of free blocks may be shortened.

The victim block determiner 212 may determine the victim blocks so that an amount of the valid data stored in the memory blocks to be simultaneously erased in the garbage collection operation becomes minimum. As the amount of the valid data stored in the victim block decreases, the efficiency of garbage collection operation may increase.

The victim block determiner 212 may determine the number of victim blocks according to the number of free blocks among the memory blocks of the memory device 100, based on the free block information and the simultaneously erasable block information.

For example, it is assumed that n (n is a natural number of equal to or greater than 1) memory blocks or m (m is a natural number greater than n) memory blocks among the candidate blocks may be simultaneously erased. When the number of free blocks is insufficient, the victim block determiner 212 may determine the number of victim blocks as n. This is because when the number of victim blocks is n, the garbage collection operation takes less time and the free blocks may be secured faster than a case where the number of victim blocks is m. In contrast, when the number of free blocks is sufficient, the victim block determiner 212 may determine the number of victim blocks as m. This is because when the number of victim blocks is m, the garbage collection operation takes longer time, but a larger number of free blocks may be secured, than a case where the number of victim blocks is n.

In another embodiment, the victim block determiner 212 may determine the reference number of victim blocks based on the number of free blocks among the memory blocks of the memory device 100, based on the free block information. Specifically, the victim block determiner 212 may monitor the number of candidate blocks in which the valid data is equal to or less than a predetermined ratio until the number of candidate blocks that may be simultaneously erased reaches a reference number.

When the number of candidate blocks that may be simultaneously erased is equal to or greater than the reference number, the victim block determiner 212 may determine the corresponding candidate blocks as the victim blocks.

The victim block determiner 212 may provide victim block information indicating the determined victim blocks to the operation controller 220.

The operation controller 220 may control the memory device 100 to copy the valid data stored in the victim blocks to the other memory block based on the victim block information. When the valid data stored in the victim blocks is copied to the other memory block, the operation controller 220 may control the memory device 100 to simultaneously erase the victim blocks.

Figure 8:
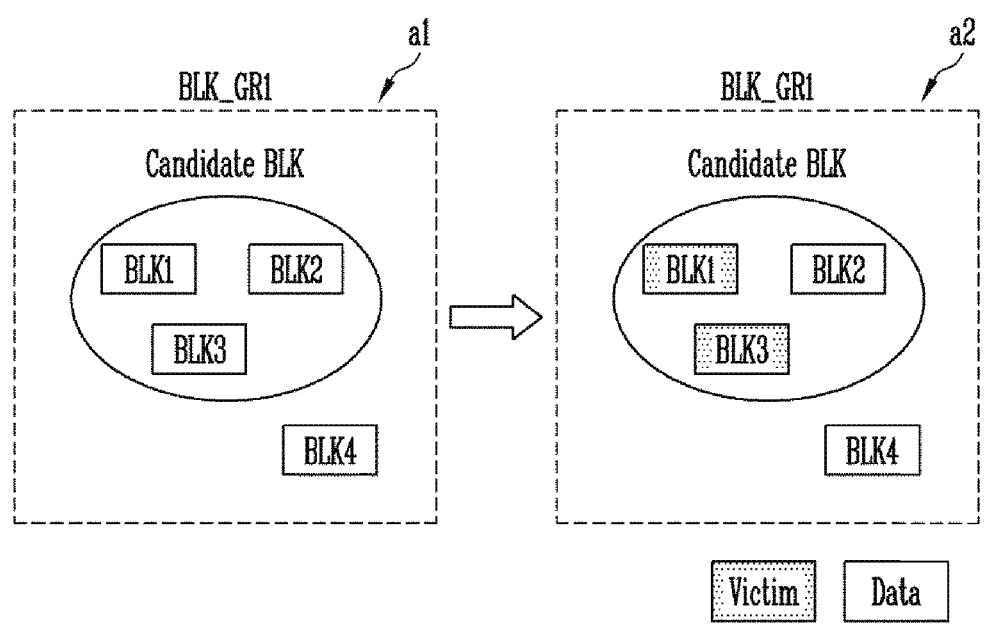
FIG. 8 is a diagram for describing a victim block determination according to an embodiment.

FIG. 8 is a diagram for describing a victim block determination according to an embodiment.

Referring to FIGS. 5 and 8, the memory device may include the first memory block group BLK_GR1. The first memory block group BLK_GR1 may include the first to fourth memory blocks BLK1 to BLK4. The number of memory block groups included in the memory device and the number of memory blocks included in each memory block group are not limited to the present embodiment.

At a time a1, the first to third memory blocks BLK1 to BLK3 may be the candidate blocks in which the valid data is equal to or less than a predetermined ratio. An amount of the valid data stored in the first and third memory blocks BLK1 and BLK3 may be less than an amount of the valid data stored in the first and second memory blocks BLK1 and BLK2.

Referring to FIG. 6, the first and second memory blocks BLK1 and BLK2 may be simultaneously erased. Alternatively, the first and third memory blocks BLK1 and BLK3 may be simultaneously erased.

In an embodiment, two or more memory blocks that may be simultaneously erased among the candidate blocks may be determined as the victim blocks. In an embodiment, the victim block may be determined so that the number of memory blocks that are simultaneously erased becomes maximum. Therefore, the number of victim blocks may be determined as two rather than one. In an embodiment, the victim block may be determined so that the amount of the valid data stored in the memory block that is simultaneously erased becomes minimum. Therefore, the first and third memory blocks BLK1 and BLK3 may be determined as the victim blocks, instead of the first and second memory blocks BLK1 and BLK2.

At a time a2, the valid data stored in the first and third memory blocks BLK1 and BLK3 determined as the victim blocks may be copied to the other memory block. Thereafter, the first and third memory blocks BLK1 and BLK3 may be used as free blocks. The first and third memory blocks BLK1 and BLK3 may store new data after being simultaneously erased.

Figure 9:
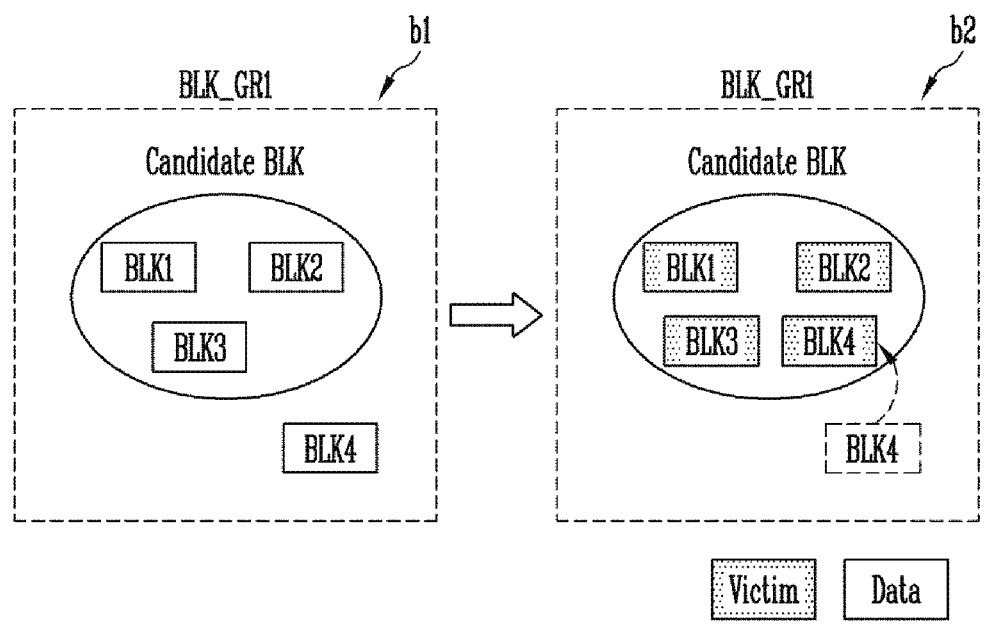
FIG. 9 is a diagram for describing the victim block determination according to another embodiment.

FIG. 9 is a diagram for describing the victim block determination according to another embodiment.

Referring to FIGS. 5 and 9, the memory device may include the first memory block group BLK_GR1. The first memory block group BLK_GR1 may include the first to fourth memory blocks BLK1 to BLK4. The number of memory block groups included in the memory device and the number of memory blocks included in each memory block group are not limited to the present embodiment.

At a time b1, the first to third memory blocks BLK1 to BLK3 may be the candidate blocks in which the valid data is equal to or less than a predetermined ratio. The fourth memory block may be a block in which the valid data exceeds the predetermined ratio.

Referring to FIG. 6, the first and second memory blocks BLK1 and BLK2 may be simultaneously erased. Alternatively, the first and third memory blocks BLK1 and BLK3 may be simultaneously erased. Alternatively, the first to fourth memory blocks BLK1 to BLK4 may be simultaneously erased.

In an embodiment, the reference number of victim blocks may be determined according to the number of free blocks. In FIG. 9, the reference number of victim blocks may be four. The reference number of victim blocks is not limited to the present embodiment.

In an embodiment, the number of candidate blocks may be monitored until the number of candidate blocks that may be simultaneously erased reaches the reference number. When the number of candidate blocks that may be simultaneously erased is equal to or greater than the reference number, the candidate blocks may be determined as the victim blocks.

For example, at the time b1, the number of candidate blocks that may be simultaneously erased may be two. Therefore, because the number of candidate blocks is less than four, which is the reference number, the number of candidate blocks may be monitored until a time b2.

At the time b2, the first to fourth memory blocks BLK1 to BLK4 may be the candidate blocks in which the valid data is equal to or less than the predetermined ratio. Therefore, because the number of candidate blocks that may be simultaneously erased is four and is equal to the reference number of victim blocks, the first to fourth memory blocks BLK1 to BLK4 may be determined as the victim blocks.

At the time b2, the valid data stored in the first to fourth memory blocks BLK1 to BLK4 determined as the victim blocks may be copied to the other memory block. Thereafter, the first to fourth memory blocks BLK1 to BLK4 may be used as the free blocks. The first to fourth memory blocks BLK1 to BLK4 may store new data after being simultaneously erased.

Figure 10:
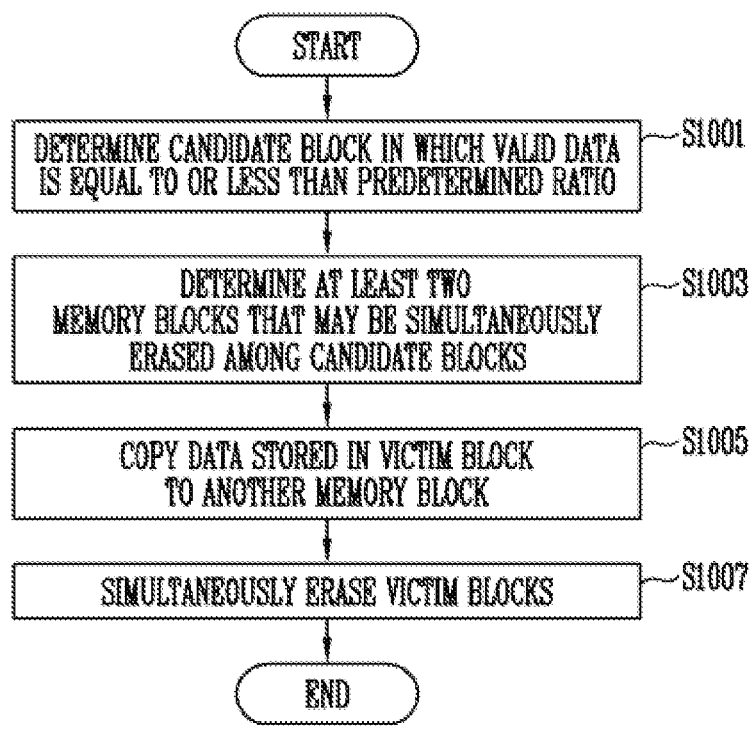
FIG. 10 is a flowchart for describing a garbage collection operation according to an embodiment.

FIG. 10 is a flowchart for describing the garbage collection operation according to an embodiment.

Referring to FIG. 10, in step S1001, the candidate blocks in which the data is equal to or less than the predetermined ratio may be determined.

In step S1003, two or more memory blocks that may be simultaneously erased among the candidate blocks may be determined as the victim blocks.

In step S1005, the data stored in the victim blocks may be copied to the other memory block. Thereafter, the victim blocks may be used as the free blocks.

In step S1007, the victim blocks may be simultaneously erased. Thereafter, the erased victim blocks may store new data.

Figure 11:
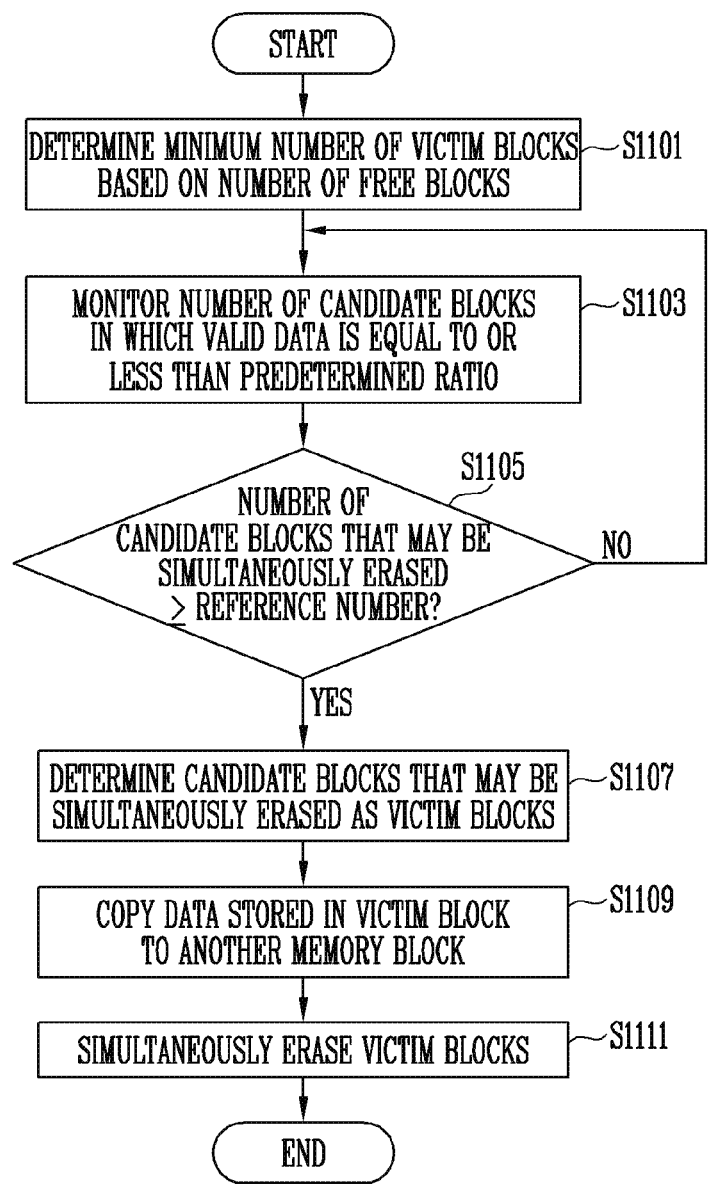
FIG. 11 is a flowchart for describing the garbage collection operation according to another embodiment.

FIG. 11 is a flowchart for describing the garbage collection operation according to another embodiment.

Referring to FIG. 11, in step S1101, the reference number of victim blocks may be determined based on the number of free blocks.

In step S1103, the number of candidate blocks in which the valid data is equal to or less than the predetermined ratio may be monitored.

In step S1105, it may be determined whether the number of candidate blocks that may be simultaneously erased is equal to or greater than the reference number determined in step S1101. As a result of determination, when the number of candidate blocks is equal to or greater than the reference number, the process proceeds to step S1107, and when the number of candidate blocks is less than the reference number, the process proceeds to step S1103.

In step S1107, the candidate blocks that may be simultaneously erased may be determined as the victim blocks.

In step S1109, the data stored in the victim block may be copied to the other memory block. Thereafter, the victim blocks may be used as the free blocks.

In step S1111, the victim blocks may be simultaneously erased. Thereafter, the erased victim blocks may store new data.

Figure 12:
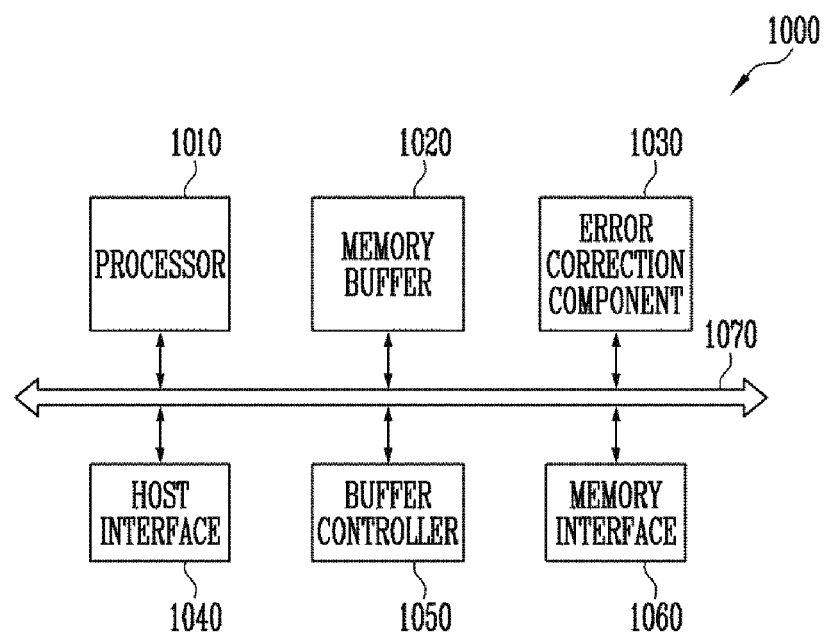
FIG. 12 is a diagram for describing another embodiment of the memory controller of FIG. 1.

FIG. 12 is a diagram for describing another embodiment of the memory controller 200 of FIG. 1.

Referring to FIG. 12, a memory controller 1000 is connected to the host Host and the memory device. The memory controller 1000 is configured to access the memory device in response to the request from the host Host. For example, the memory controller 1000 is configured to control write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error correction component (ECC) 1030, a host interface 1040, a buffer control circuit 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the flash translation layer (FTL). The flash translation layer (FTL) may receive the logical block address (LBA) using a mapping table and may convert the logical block address (LBA) into the physical block address (PBA). There are various address mapping methods of the flash translation layer, according to a mapping unit. Representative address mapping methods include a page mapping method, a block mapping method, and a hybrid mapping method.

The processor 1010 is configured to randomize data received from the host Host. For example, the processor 1010 may randomize the data received from the host Host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error correction component 1030 may perform error correction. The error correction component 1030 may perform error correction encoding (ECC encoding) based on data to be stored in the memory device through memory interface 1060. The error correction encoded data may be transferred to the memory device through the memory interface 1060. The error correction component 1030 may perform error correction decoding (ECC decoding) on the data received from the memory device through the memory interface 1060. As an example, the error correction component 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

As an example, the memory controller 1000 might not include the memory buffer 1020 and the buffer controller 1050.

As an example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

As an example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and might not interfere with each other or affect each other. The data bus may be connected to the host interface 1040, the buffer controller 1050, the error correction component 1030, and the memory interface 1060. The control bus may be connected to the host interface 1040, the processor 1010, the buffer controller 1050, the memory buffer 1202, and the memory interface 1060.

In an embodiment, the garbage collection controller 210 and the operation controller 220 described with reference to FIG. 1 may be included in the processor 1010.

Figure 13:
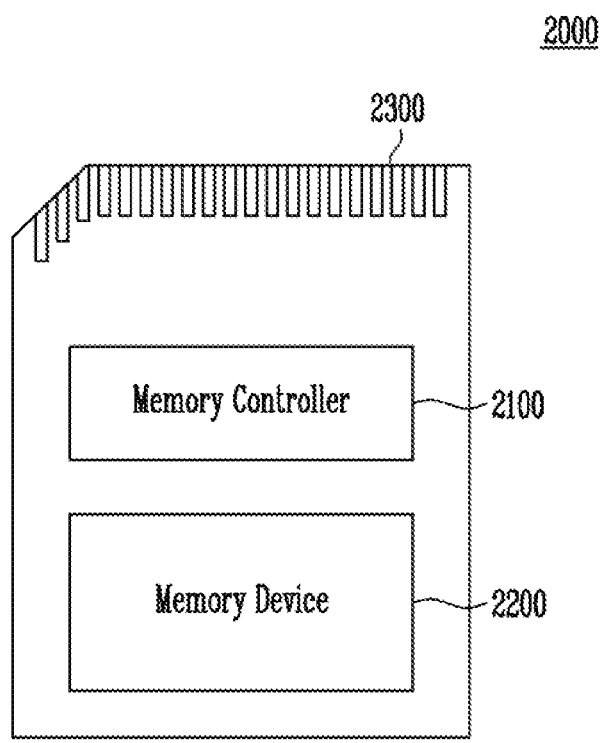
FIG. 13 is a block diagram illustrating a memory card system to which a storage device according to an embodiment of the present disclosure is applied.

FIG. 13 is a block diagram illustrating a memory card system to which a storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and the host Host. The memory controller 2100 is configured to drive firmware for controlling the memory device 2200. The memory controller 2100 may be implemented equally to the memory controller 200 described with reference to FIG. 1.

As an example, the memory controller 2100 may include components such as a random access memory (RAM), a processor, a host interface, a memory interface, and an error correction component.

The memory controller 2100 may communicate with an external device through the connector 2300. The memory controller 2100 may communicate with an external device (for example, the host) according to a specific communication standard. As an example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe. As an example, the connector 2300 may be defined by at least one of the various communication standards described above.

As an example, the memory device 2200 may be configured as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
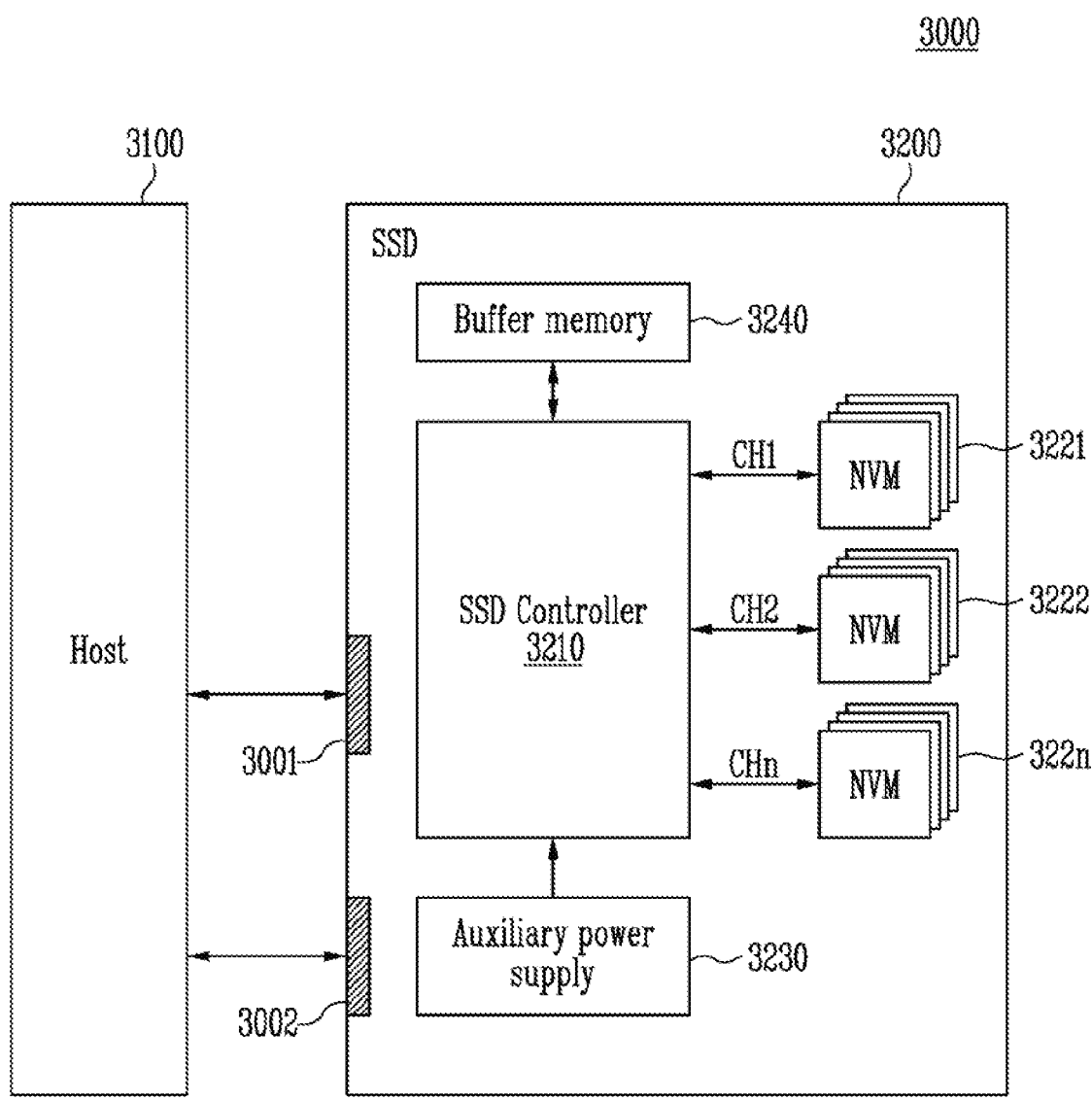
FIG. 14 is a block diagram illustrating a solid state drive (SSD) system to which a storage device according to an embodiment of the present disclosure is applied.

FIG. 14 is a block diagram illustrating a solid state drive (SSD) system 3000 to which a storage device according to an embodiment of the present disclosure is applied.

Referring to FIG. 14, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be positioned in the SSD 3200 or may be positioned outside the SSD 3200.

For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 15:
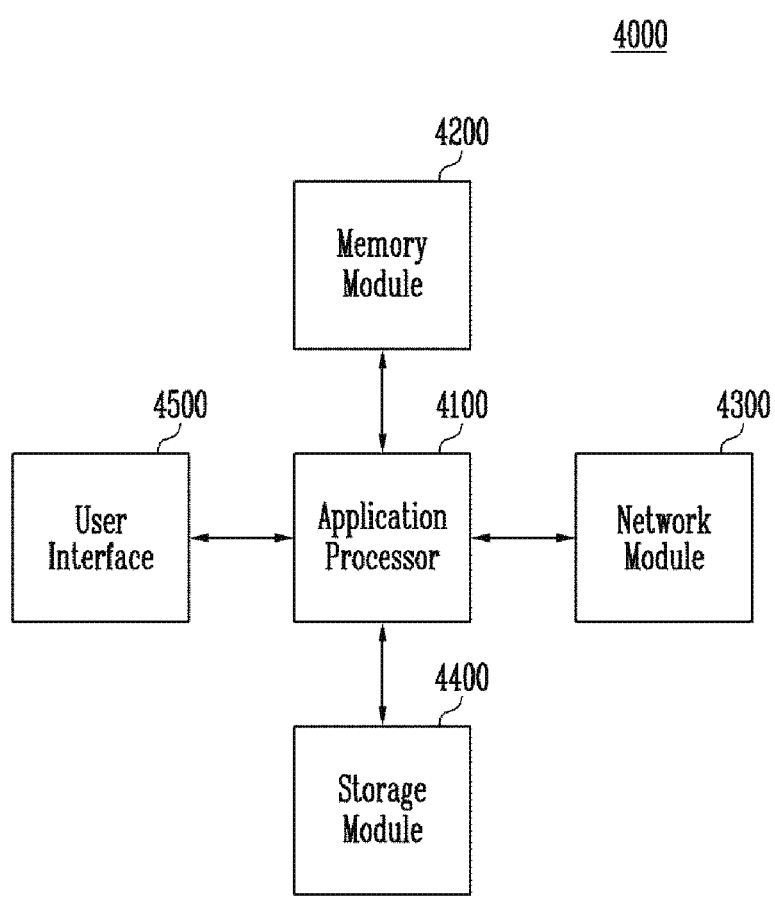
FIG. 15 is a block diagram illustrating a user system to which a storage device according to an embodiment of the present disclosure is applied.

FIG. 15 is a block diagram illustrating a user system to which a storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. As an example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. As an example, the application processor 4100 and memory module 4200 may be packaged based on a package on package (POP) and provided as one semiconductor package.

The network module 4300 may communicate with external devices. As an example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. As an example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. As an example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. As an example, the storage module 4400 may be provided as a removable storage device (removable drive), such as a memory card, and an external drive of the user system 4000.

As an example, the storage module 4400 may include a plurality of non-volatile memory devices, and the plurality of non-volatile memory devices may operate equally to the memory device 100 described with reference to FIG. 1. The storage module 4400 may operate equally to the storage device 50 described with reference to FIG. 1.

The user interface 4500 may include interfaces for inputting data or an instruction to the application processor 4100 or for outputting data to an external device. As an example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller for controlling a memory device including a plurality of memory blocks, the memory controller comprising:
   a garbage collection controller configured to determine candidate blocks in which a valid data ratio is equal to or less than a predetermined ratio among the plurality of memory blocks, and configured to determine two or more memory blocks as victim blocks among the candidate blocks based on information on memory blocks to be simultaneously erasable among the plurality of memory blocks; and
   an operation controller configured to control the memory device to copy valid data stored in the victim blocks to a different memory block,
   wherein the valid data ratio indicates a ratio of a number of valid pages to a number of total pages in a memory block,
   wherein the victim blocks includes first, second, third, and fourth memory blocks,
   wherein the first memory block is connected to a first global word line through a first path switch,
   wherein the second memory block is connected to the first global word line through a second path switch,
   wherein the third memory block is connected to a second global word line through a third path switch,
   wherein the fourth memory block is connected to the second global word line through a fourth path switch,
   wherein a first block word line control signal is applied to the first and third path switches,
   wherein a second block word line control signal is applied to the second and fourth path switches,
   wherein the first and second memory blocks are simultaneously erased according to an operation voltage applied to the first global word line and the first and second block word line control signals, and
   wherein the first and third memory blocks are simultaneously erased according to an operation voltage applied to the first and second global word lines and the first block word line control signal.

2. The memory controller of claim 1, wherein the operation controller is configured to control the memory device to simultaneously erase the victim blocks after the valid data is copied to the different memory block.

3. The memory controller of claim 1, wherein the garbage collection controller comprises:
   a block manager configured to store block management information on the plurality of memory blocks; and
   a victim block determiner configured to determine the victim blocks based on the block management information.

4. The memory controller of claim 3, wherein the block management information includes:
information on the candidate blocks;
the information on the memory blocks to be simultaneously erasable; and
information on a free block among the plurality of memory blocks.

5. The memory controller of claim 3, wherein the victim block determiner is configured to determine the victim blocks in a way that a number of memory blocks to be simultaneously erasable is maximized.

6. The memory controller of claim 5, wherein the victim block determiner is configured to determine the victim blocks in a way that an amount of valid data stored in the memory blocks to be simultaneously erasable is minimized.

7. The memory controller of claim 3, wherein the victim block determiner is configured to determine a number of the victim blocks according to a supply of a free block that is determined based on a number of free blocks among the plurality of memory blocks.

8. A memory controller, for controlling a memory device including a plurality of memory blocks, the memory controller comprising:
a garbage collection controller configured to determine a reference number of victim blocks based on a number of free blocks among the plurality of memory blocks, and configured to determine candidate blocks as the victim blocks based on a comparison between a number of the candidate blocks to be simultaneously erasable among the plurality of memory blocks and the reference number of the victim blocks; and
an operation controller configured to control the memory device to copy valid data stored in the victim blocks to a different memory block,
wherein the victim blocks includes first, second, third, and fourth memory blocks,
wherein the first memory block is connected to a first global word line through a first path switch,
wherein the second memory block is connected to the first global word line through a second path switch,
wherein the third memory block is connected to a second global word line through a third path switch,
wherein the fourth memory block is connected to the second global word line through a fourth path switch,
wherein a first block word line control signal is applied to the first and third path switches,
wherein a second block word line control signal is applied to the second and fourth path switches,
wherein the first and second memory blocks are simultaneously erased according to an operation voltage applied to the first global word line and the first and second block word line control signals, and
wherein the first and third memory blocks are simultaneously erased according to an operation voltage applied to the first and second global word lines and the first block word line control signal.

9. The memory controller of claim 8, wherein the operation controller is configured to control the memory device to simultaneously erase the victim blocks after the valid data is copied to the different memory block.

10. The memory controller of claim 8, wherein the garbage collection controller comprises:
a block manager configured to store block management information on the plurality of memory blocks; and
a victim block determiner configured to determine the victim blocks based on the block management information.

11. The memory controller of claim 10, wherein the block management information includes:
information on the candidate blocks among the plurality of memory blocks;
information on memory blocks to be simultaneously erasable among the plurality of memory blocks; and
information on the free blocks among the plurality of memory blocks.

12. The memory controller of claim 10, wherein the victim block determiner is configured to determine the candidate blocks as the victim blocks when the number of the candidate blocks reaches the reference number of the victim blocks.

13. The memory controller of claim 8, wherein the reference number of the victim blocks is determined based on the number of the free blocks.

14. The memory controller of claim 8, wherein the candidate blocks comprise memory blocks for which a valid data ratio is equal to or less than a predetermined ratio, and
wherein the valid data ratio indicates a ratio of a number of valid pages to a number of total pages in a memory block.

15. A method of operating a storage device including a plurality of memory blocks, the method comprising:
determining candidate blocks in which a valid data ratio is equal to or less than a predetermined ratio among the plurality of memory blocks;
determining at least four memory blocks to be simultaneously erasable as victim blocks among the candidate blocks; and
copying valid data stored in the victim blocks to a different memory block,
wherein the valid data ratio indicates a ratio of a number of valid pages to a number of total pages in a memory block,
wherein the at least four memory blocks include first, second, third, and fourth memory blocks,
wherein the first memory block is connected to a first global word line through a first path switch,
wherein the second memory block is connected to the first global word line through a second path switch,
wherein the third memory block is connected to a second global word line through a third path switch,
wherein the fourth memory block is connected to the second global word line through a fourth path switch,
wherein a first block word line control signal is applied to the first and third path switches, and
a second block word line control signal is applied to the second and fourth path switches.

16. The method of claim 15, further comprising: erasing the first and second memory blocks using an operation voltage applied to the first global word line and the first and second block word line control signals.

17. The method of claim 15, wherein determining the at least four memory blocks as the victim blocks comprises determining the victim blocks so that a number of memory blocks to be simultaneously erasable is maximized.

18. The method of claim 17, wherein the victim blocks are determined so that an amount of valid data stored in the memory blocks to be simultaneously erasable is minimized.

19. The method of claim 15, wherein determining the at least four memory blocks as the victim blocks comprises:
determining a reference number of the victim blocks based on a number of free blocks among the plurality of memory blocks, and determining the at least four memory blocks as the victim blocks when a number of the at least four memory blocks reaches the reference number.

20. The method of claim 15, further comprising:

erasing the first and third memory blocks using an operation voltage applied to the first and second global word lines and the first block word line control signal.

* * * * *